United States Patent [19]
Kim et al.

[11] Patent Number: 5,834,558
[45] Date of Patent: Nov. 10, 1998

[54] WEATHER RESISTANT THEROMPLASTIC RESIN COMPOSITION

[75] Inventors: Hyung-Su Kim, Seoul; Sung-Yeul Lim, Kyungki-do, both of Rep. of Korea

[73] Assignee: Cheil Industries, Inc., Taeku, Rep. of Korea

[21] Appl. No.: 709,256

[22] Filed: Sep. 10, 1996

Related U.S. Application Data

[63] Continuation-in-part of Ser. No. 245,299, May 17, 1994.
[51] Int. Cl.⁶ .................................................. C08L 51/04
[52] U.S. Cl. .................. 525/76; 525/71; 525/74; 525/78; 525/80; 525/214
[58] Field of Search .................. 525/76, 80, 71, 525/74, 78, 214

[56] References Cited

U.S. PATENT DOCUMENTS

| | | | |
|---|---|---|---|
| 4,528,328 | 7/1985 | Rauade et al. | 525/71 |
| 4,537,933 | 8/1985 | Walker et al. | 525/71 |

*Primary Examiner*—Mark L. Warzel
*Attorney, Agent, or Firm*—Maria Parrish Tungol

[57] ABSTRACT

A styrenic thermoplastic resin composition comprising a mixture of: (A) 50–90 wt % of a styrenic polymer; (B) 5–35 wt % of a chlorinated polyethylene; (C) 5–35 wt % of a modified ethylene-propylenic rubber; and (D) 0–10 wt % of vinyl graft copolymer has superior weather resistance and mechanical properties such as impact strength and tensile properties. The resin composition also provides improved layer peeling tendency which is one of the most troublesome problems in conventional resins such as acrylonitrile-chlorinated polyethylene-styrene resins.

22 Claims, 2 Drawing Sheets

WEATHER RESISTANT THEROMPLASTIC RESIN COMPOSITION

This application is a continuation-in-part of Ser. No. 08/245,299 that was filed on May 17, 1994.

FIELD OF THE INVENTION

The present invention relates, in general, to a styrenic thermoplastic resin composition and, more particularly, to improvements in weather resistance and mechanical properties along with reduced layer peeling tendency.

BACKGROUND OF THE INVENTION

Graft copolymers of styrene and acrylonitrile on a butadiene homo- or copolymer are known as ABS polymers. These ABS polymers are widely used for various home and office appliances by virtue of their superior mechanical and physical properties, chemical resistance and processability. Among the superior properties, impact resistance is largely attributed to a butadiene rubber, which contains unsaturated bonds therein. The graft copolymer, however, is sensitive to oxidation under the influence of light and/or molecular oxygen. Owing to this, articles made thereof will become inferior in the physical and mechanical properties, suffering from discoloration. Consequently, it is problematic to apply ABS polymer for outdoor application.

In order to solve this problem, it has been proposed in U.S. Pat. Nos. 3,886,223 and 4,007,234 to replace the butadiene rubber with an ethylene-propylene rubber (hereinafter, referred to as "EPR") or an ethylene-propylene-diene rubber (hereinafter, referred to as "EPDM"). Neither one of the rubbers suggested contains a conjugated double bond that could be graft polymerized with styrene-acrylonitrile copolymer (hereinafter, referred to as "SAN"), so as to give an superior impact resistant resin composition.

On the other hand, U.S. Pat. No. 4,528,328 discloses a technique in which an acrylic rubber is introduced to achieve weather resistance as well as impact resistance. U.S. Pat. No. 4,537,933 discloses the use of polyolefin graft polymers that require a predominant amount of vinyl halide monomer.

An apparent drawback of these techniques, however, is insufficient flowability of the graft copolymers, by which problems may be encountered in molding of intricate parts. In addition, due to the incorporation of predominant amounts of vinyl halide in the olefin graft copolymer, the thermal stability of the resin composition can deteriorate during the continuous and prolonged injection molding operation. Furthermore, obviously, an additional complicated production system must be developed for producing such graft copolymers.

Meanwhile, Japanese Pat. Publication Nos. Sho. 39-17057 and Sho. 41-6351 suggest a chlorinated polyethylene rubber (hereinafter, referred to as "CPE") having grafted thereonto or blended therewith a SAN copolymer instead of the butadiene rubber. In the Japanese patents recited, there is produced an acrylonitrile-chlorinated polyethylene-styrene resin (hereinafter, referred to as "ACS") with improved heat and weather resistance. However, impact strength and other mechanical properties are insufficient.

In an attempt to overcome the above described problems, Japanese Pat. Publication No. Sho. 48-44933 discloses a technique in which CPE is added in combination with a small amount of EPR or EPDM to improve the impact strength of the ACS resin. In this case, however, the improvement of the impact strength is not so significant, and layer peeling tendency is unfortunately observed.

Other attempts to overcome the aforementioned problems have been made earnestly. It has been suggested in European Pat. No. 37609 and U.S. Pat. Nos. 4,341,884 and 4,468,487 that the amount of the EPDM be increased and a crystalline CPE be used. Even in these cases, it appears that the improvements in the mechanical strengths and layer peeling tendency are only marginal.

SUMMARY OF THE INVENTION

Therefore, an object of the present invention is to overcome the problems encountered in prior arts and to provide a styrenic thermoplastic resin composition superior in mechanical properties and weather resistance with drastically reduced layer peeling tendency.

Based on the intensive and thorough study by the present inventors, the above object could be achieved by blending a styrenic resin, CPE, a modified ethylene-propylenic rubber and a vinyl graft copolymer in a proper ratio.

The present invention is distinguished by the characteristics that the blended polymer composition comprises:

(A) 50–90% by weight of a styrenic copolymer obtained by the polymerization of a mixture consisting of (a) 60–85% by weight of an aromatic vinyl monomer, (b) 40–15% by weight of a vinyl cyanide monomer and (c) 0–40% by weight of other copolymerizable vinyl monomers;

(B) 5–35% by weight of CPE having a chlorine content of 20–40% by weight;

(C) 5–35% by weight of a modified ethylene-propylenic rubber obtained by melt blending (a) 0.50–2 parts by weight of an organic peroxide and (b) 1–5 parts by weight of a reactive monomer containing a carboxyl group or an anhydrous carboxyl group in (c) 100 parts of an ethylene-propylenic rubber selected from the group consisting of EPR and EPDM; and (D) 0–10wt % of a vinyl graft copolymer.

BRIEF DESCRIPTION OF THE DRAWINGS

The above objective and other advantages of the present invention will become more apparent by describing in detail the preferred embodiment of the present invention with reference to the attached drawings in which.

DETAILED DESCRIPTION OF THE INVENTION

Figure 1:
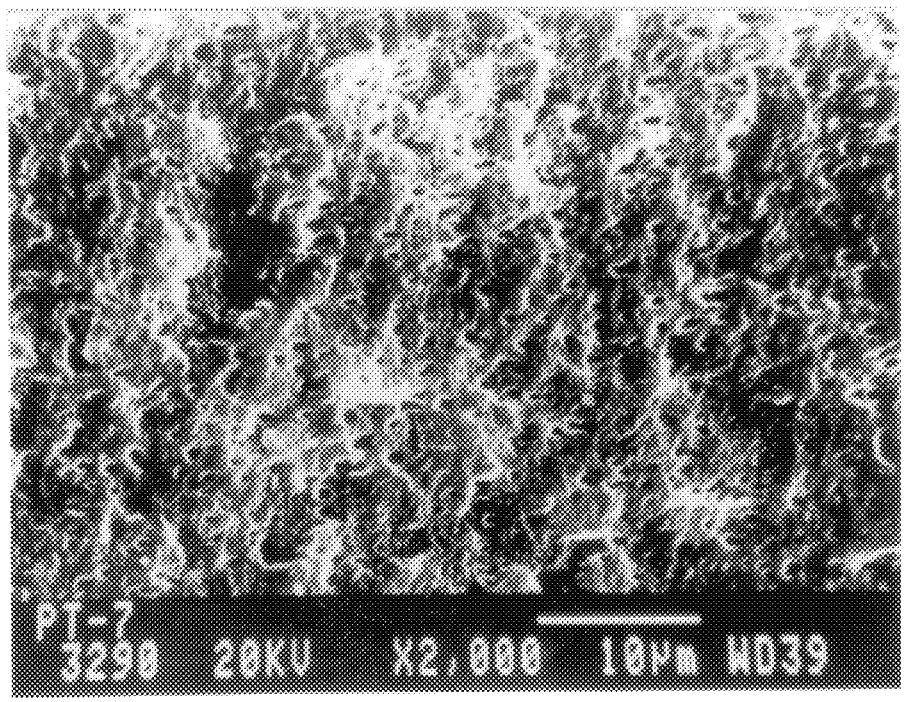
FIG. 1 is a scanning electron photomicrograph showing the fracture surface of the specimen based on the resin composition of comparative example 1.

In accordance with the present invention, a styrenic thermoplastic resin composition is provided. The resin composition comprises a styrenic copolymer in combination with CPE and a modified ethylene-propylenic rubber and optionally with a vinyl graft copolymer.

The styrenic copolymer may be prepared from aromatic vinyl monomers, vinyl cyanide monomers and other copolymerizable monomers by any one of known polymerization processes, such as emulsion polymerization, suspension polymerization, bulk polymerization or continuous polymerization. This copolymer occupies the major part of the styrenic thermoplastic resin composition according to the present invention and is preferably in amounts ranging from approximately 50 to 90% by weight, based on the total weight of the composition.

Preferred aromatic vinyl monomer used in the present invention includes styrene, α-methylstyrene and vinyl toluene. As the vinyl cyanide monomer of the styrenic copolymer, there can be mentioned acrylonitrile and methacrylonitrile. In addition, other copolymerizable monomer can be selected from the group consisting of methyl, ethyl, propyl and n-butyl of acrylic acid, methacrylic acid, and maleimide monomers, such as maleimide, N-methyl maleimide and N-phenyl maleimide.

Another ingredient of the present invention, CPE, can be manufactured in such a manner that polyethylene is chlorinated by applying a solution, suspension or gas reaction process. This process is described in U.S. Pat. Nos. 3,935,181 and 4,197,386 both of which are herein incorporated by reference.

Taking into account the compatibility with the modified ethylene-propylenic rubber and the impact strength reinforcing effect in the final article made of the inventive composition, the chlorine content of the CPE is preferably on the order of approximately 20 to approximately 40% by weight.

The CPE is preferably present in amounts ranging from approximately 5 to 35% by weight, based on the total weight of the composition according to the present invention and more preferably from approximately 10 to approximately 25% by weight. For example, if too little CPE is used, the obtained composition is poor in impact resistance. On the other hand, if too much CPE is used, tensile strength and hardness are not satisfactory and excessive gas is generated during molding into articles, leading to practical uselessness.

As mentioned above, the modified ethylene-propylenic rubber is obtained by melt blending an organic peroxide and a reactive monomer in an ethylene-propylenic rubber. The organic peroxide used in the present invention is selected from the group consisting of diisopropyl benzene hydroperoxide, di-t-butylperoxide, t-butylcumylperoxide, dicumylperoxide, di-t-butyldiperoxy phthalate, succinic acid peroxide, t-butylperoxy benzoate, t-butylperoxy maleic acid, methylethyl ketone peroxide and cyclohexanone peroxide. Among them, the most preferred is dicumyl peroxide in a view of reactivity and processability. This organic peroxide is preferably added in amounts ranging from approximately 0.5 to approximately 2.0 parts by weight, based on the weight of the ethylene-propylenic rubber. For example, if the amount thereof exceeds 2 parts by weight, excessive crosslinking occurs, reducing the effectiveness of impact modification.

The reactive monomer blended into the modified ethylene-propylenic rubber has a carboxyl group or an anhydrous carboxyl group and examples thereof is maleic acid, maleic anhydride, fumaric acid, acrylic acid and methacrylic acid ester. Among these monomers, the most preferred is maleic anhydride. This reactive monomer is preferably blended in amounts ranging from approximately 1 to approximately 5 parts by weight, based on the weight of ethylene-propylenic rubber. For example, if too little reactive monomer is added, the layer peeling tendency is not improved. On the other hand, if too much reactive monomer is used, the impact strength becomes poor.

Unlike some compositions of the prior art, the modified ethylene-propylenic rubber encompassed in the present invention does not require vinyl halide monomer. The ethylene-propylenic rubber can be modified in the substantial absence of vinyl halide monomer. This excludes the predominant amounts of vinyl halide required by the prior art and any minor amounts of vinyl halide monomer that would cause the thermal stability of the resin composition to deteriorate during continuous and prolonged injection molding. The Examples show the results of modifying the ethylene-propylenic rubber in the absence of vinyl halide monomer.

As the diene contained in the EPDM of (c) component, there can be mentioned 1,4-hexadiene,dicyclopentadiene, 5-vinylonorbornene and 2,5-ethylidene norbornene 2–8 parts for 100 parts of the EPDM.

In preparing the modified ethylene-propylenic rubber, the organic peroxide (a) and the reactive monomer (b) and the ethylene-propylenic rubber (c) are added together, and then are melt-blended using a Banbury type mixer or an extruder.

Optionally contained in the styrenic thermoplastic resin composition according to the present invention, a vinyl graft copolymer consists of a backbone chain component and a branch component.

As the backbone component of the vinyl graft copolymer, there may be employed a copolymer of an ester compound of methylmethacrylic acid, butylmethacrylic acid, or butylacrylic acid, a monomer containing a carboxyl group, such as vinyl acetate, and an olefinic monomer, such as ethylene and propylene. Among them, ethylene vinylacetate or ethylene/ethyl acrylate is preferred.

As the branch component of the vinyl graft copolymer, a copolymer of styrene monomer and vinyl cyanide monomer is employed and preferably a copolymer of styrene and acrylonitrile.

Taking account into impact resistance, the amount of the monomer containing a carboxyl group is preferably in the range of approximately 0.5 to approximately 40% by weight, based on the backbone chain component. For example, if the amount of the carboxyl-containing monomer departs from the above range, there occurs the degradation of impact strength reinforcing effect.

Similarly, the backbone chain component is preferably in the range of approximately 40 to approximately 90% by weight, based on the vinyl graft copolymer.

Preferably, the vinyl graft copolymer does not exceed approximately 10% by weight, based on the total weight of the styrenic resin composition. Too much vinyl graft copolymer deteriorates mechanical properties, such as tensile strength and tensile elongation.

The styrenic thermoplastic resin composition of the present invention may be prepared by known methods. For example, the styrenic copolymer is typically mixed with the CPE in combination with the modified ethylene-propylenic rubber and the vinyl graft copolymer and then melt blended in a Banbury type mixer or an extruder.

In contrast to the prior arts, the present invention is unique in terms of using the modified EPR containing a carboxyl group. In accordance with the present invention, the styrenic thermoplastic resin composition shows significantly diminished layer peeling tendency with superior mechanical properties and weather resistance. These remarkable improvements are believed to be attributed to the favorable interactions between a modified ethylene-propylenic rubber (C) and CPE (B).

Figure 2:
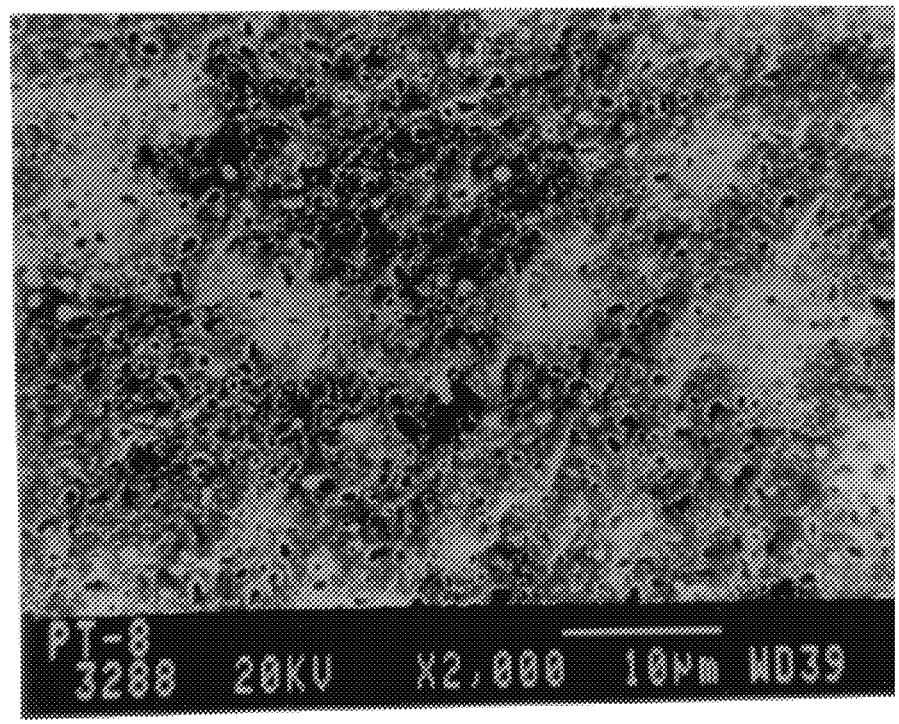
FIG. 2 is a scanning electron photomicrograph showing the fracture surface of the specimen based on the resin composition of comparative example 2.
Figure 3:
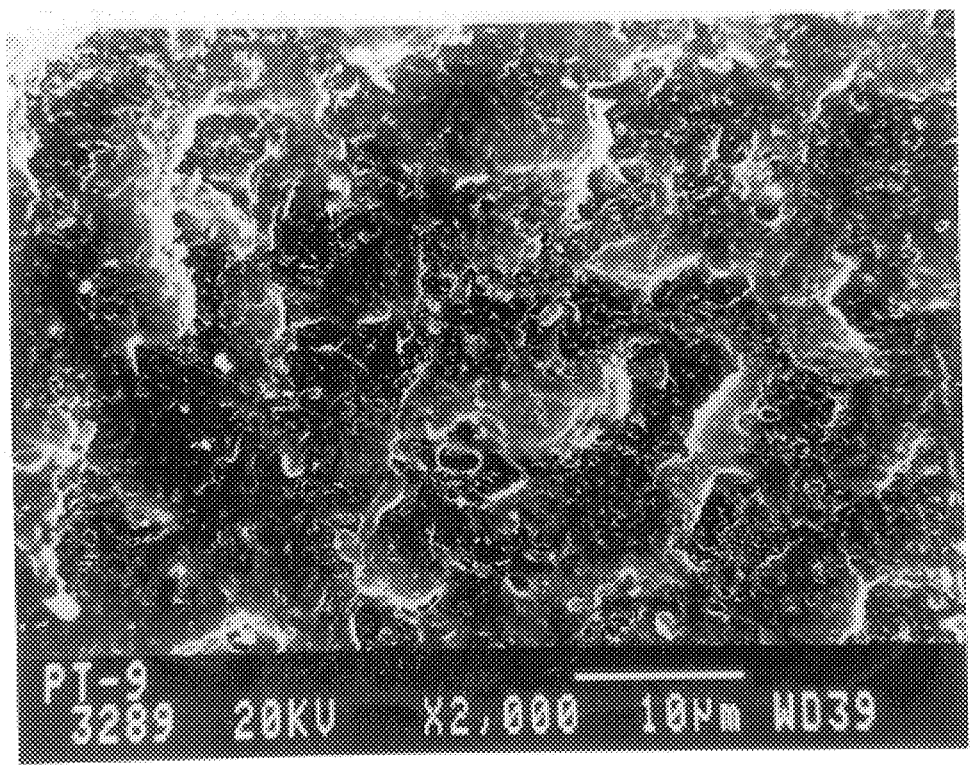
FIG. 3 is a scanning electron photomicrograph showing the fracture surface of the specimen based on the resin composition of comparative example 3.

As can be seen in FIGS. 1 to 3, when a modified ethylene-propylenic rubber (C) is used, the distribution of the rubber particles becomes more uniform, compared with the case of using the ethylene-propylenic rubber.

Other agents, such as flame retardants, antioxidants, lubricants, light stabilizers and pigments may be used, if necessary.

In order to better understand the nature of the present invention, a number of non-limiting examples will now be described.

Where not otherwise specified in the following examples, the expression "part" is by weight.

REFERENTIAL EXAMPLES

Preparation of styrenic copolymer (A)

A-1: 5 g of dodecyl mercaptan was added to a composition composed of 730 g of styrene and 270 g of acrylonitrile, and a suspension polymerization was carried out within a reaction vessel.

A-2: 5 g of t-dodecyl mercaptan was added to a composition composed of 710 g of alpha-methyl styrene and 290 g of acrylonitrile, and then, an emulsion polymerization was carried out.

Preparation of CPE (B)

B-1: CPE with a chlorine content of 36% by weight, commercially available from Dow Chemical company, USA.

B-2: CPE with a chlorine content of 30% by weight, commercially available from Daiso company, Japan.

B-3: CPE with a chlorine content of 40% by weight, commercially available from Daiso company, Japan.

Preparation of Modified Ethylene-Propylenic Rubber (C)

EPR, commercially available from Kumho EP Rubber Company, Korea or EPDM, commercially available from Kumho EP Rubber Company, Korea, and maleic anhydride (hereinafter, referred to as "MA") and dicumyl peroxide (hereinafter, referred to as "DCP") were mixed as shown in Table 1 below. Then, a twin screw extruder (L/D=34, diameter=40 mm) was used to prepare polymer pellets C-1–C-6. Here, the temperature of the cylinder was settled to 150° to 190° C., and the revolution speed of the screw was 400 rpm.

TABLE 1

| | unit: part by weight | | | | | |
|---|---|---|---|---|---|---|
| | C-1 | C-2 | C-3 | C-4 | C-5 | C-6 |
| ERP | 100 | 100 | 100 | 100 | 100 | |
| EPDM | | | | | | 100 |
| MA | 1.0 | 2.0 | 3.0 | 5.0 | 7.0 | 2.0 |
| DCP | 0.05 | 0.1 | 0.15 | 0.25 | 0.35 | |
| Grafted MA content | 0.4 | 1.0 | 1.2 | 1.3 | 1.4 | 1.3 |
| Gel content(%) | 2.7 | 4.8 | 18.2 | 60.5 | 82.1 | 43.5 |

In Table 1, the content of the grafted MA was determined by re-precipitating the prepared pellets in a toluene/methanol solution and measuring the area of the characteristic band of MA(1785/cm) with an infrared ray spectroscope. Further, the gel contents were computed by applying Soxhlet extraction for 8 hours to measure the weight of residual gel.

<Polymer D>

The Modiper A series of Nippon Oil & Fats Company were used, and the composition of each component is given as shown in the following Table 2.

TABLE 2

| Polymer coder | Composition | Composition Ratio |
|---|---|---|
| D-1 | (Ethylene/vinyl acetate)-g*-(Styrene/acrylonitrile) | 0.595/0.105/0.21/0.09 |
| D-2 | (Ethylene/ethylacrylate)-g (Styrene/acrylonitrile) | 0.56/0.14/0.21/0.09 |

*g: graft bond.

EXAMPLES 1 TO 7 AND COMPARATIVE EXAMPLES 1 AND 2

Polymers A,B and C were mixed in the ratios given from the following Table 4, and then pellets were formed by using a twin-screw extruder (L/D=34, diameter=40 mm). These pellets were subjected to injection molding, to give test specimens for mechanical properties and weather resistance.

The properties were measured as noted in Table 3 below, and the results are given as shown in Table 4 below. Here, the cylinder temperature was in the range of 180° to 210° C.

TABLE 3

| Properties | Test Method | Test Condition | Units |
|---|---|---|---|
| Tensile Strength | ASTM D648 | 5 mm/min, at yield | kg/cm2 |
| Tensile elongation | ASTM D648 | 5 mm/min, at break | % |
| Impact strength | ASTM D256 | 1/4" notched | kg · cm/cm |
| Weather Resistance | Weather-0-meter | 60° C., 500 hrs Xenon lamp | |
| Layer peeling tendency | Hinge test | Hinge test and Naked eyes | |

TABLE 4

| | Example No | | | | | | | C. Example No | |
|---|---|---|---|---|---|---|---|---|---|
| | E1 | E2 | E3 | E4 | E5 | E6 | E7 | CE1 | CE2 |
| Polymer A | A-1 | A-1 | A-1 | A-1 | A-1 | A-1 | A-2 | A-1 | A-1 |
| g | 70 | 70 | 70 | 70 | 70 | 70 | 70 | 70 | 70 |
| Polymer B | B-1 | B-1 | B-1 | B-1 | B-1 | B-1 | B-1 | B-1 | B-1 |
| g | 20 | 20 | 20 | 20 | 20 | 20 | 20 | 20 | 20 |

TABLE 4-continued

|  | Example No | | | | | | | C. Example No | |
| --- | --- | --- | --- | --- | --- | --- | --- | --- | --- |
|  | E1 | E2 | E3 | E4 | E5 | E6 | E7 | CE1 | CE2 |
| Polymer C | C-1 | C-2 | C-3 | C-4 | C-5 | C-6 | C-3 | EPR | EPDM |
| g | 10 | 10 | 10 | 10 | 10 | 10 | 10 | 10 | 10 |
| Tensile Strength | 405 | 429 | 463 | 481 | 425 | 466 | 387 | 362 | 409 |
| Tensile Elongation | 21 | 28 | 35 | 29 | 17 | 33 | 39 | 14 | 22 |
| Impact Strength | 18 | 24 | 31 | 27 | 21 | 29 | 14 | 18 | 20 |
| Layer peeling tendency | X | ○ | ○ | ○ | X | ○ | ⊚ | X | X |

⊚: Excellent ○: Good X: Poor

As evident from the Table 4, the use of MA-modified ethylene-propylenic rubber comes to bring about significant improvement tensile properties and impact strength. What is better, the layer peeling tendency is significantly diminished by virtue of MA-modified ethylene-propylenic rubber, according to the present invention. However, provided that the amount thereof is not proper, detrimental effects may be generated. For example, if the MA content of the modified ethylene-propylenic rubber (C) is lower than 1 part, the layer peeling tendency is not improved. On the other hand, if the MA content of the modified ethylene-propylenic rubber (C) exceeds 5 parts, the impact strength becomes inferior.

Example 7 wherein alpha-methyl styrene is used instead of styrene shows a significant improvement of the layer peeling tendency but somewhat lowered tensile strength and impact strength.

EXAMPLES 8 TO 11 AND COMPARATIVE EXAMPLES 3 TO 8

The mechanical properties and the weather resistance were measured in a manner similar to that of Example 1 to 7 except that the contents of the CPE and the modified ethylene-propylenic rubber are used as given from the following Table 5.

The measured results are given as shown in Table 5.

As apparent from the Table 5 above, the simultaneous use of the CPE and the modified EPR markedly improves tensile properties and impact strength. However, if the amount of the modified ethylene-propylenic rubber departs from the range of 5 to 35% by weight, the material properties become poor. The weather resistance tends to be lowered as the amount of CPE increases, but it shows comparable level of weather resistance with the ACS and ABS.

In Examples 8 through 11 and Comparative Examples 3 through 6 and 8, it is noted that an antioxidant and a light stabilizer were added in the amount of 0.2 parts, respectively.

EXAMPLES 12 TO 15 AND COMPARATIVE EXAMPLES 9 TO 11

A vinyl graft copolymer (D) was added for further improvement of the impact strength and layer peeling tendency. The measured results are shown in Table 6. The conditions of extension, injection molding and testing were the same as those for Examples 1 to 7.

TABLE 5

|  | Example No | | | | C. Example No | | | | | |
| --- | --- | --- | --- | --- | --- | --- | --- | --- | --- | --- |
|  | E8 | E9 | E10 | E11 | CE3 | CE4 | CE5 | CE6 | CE7 | CE8 |
| Polymer A-1 g | 70 | 70 | 70 | 70 | 70 | 70 | 60 | 60 | ACS*[1] | ABS*[2] |
| Polymer B-1 g | 5 | 10 | 15 | 25 | 30 |  | 40 |  |  |  |
| Polymer C-3 g | 25 | 20 | 15 | 5 |  | 30 |  | 40 |  |  |
| Tensile Strength | 372 | 396 | 438 | 402 | 407 | 285 | 384 | 260 |  |  |
| Tensile Elongation | 6 | 9 | 23 | 18 | 18 | 3 | 20 | 3 |  |  |
| Impact Strength | 4 | 6 | 24 | 15 | 12 | 3 | 15 | 3 |  |  |
| Weather Resistance(delta E) | 0.49 | 0.52 | 0.59 | 0.78 | 1.12 | 0.45 | 1.37 | 0.48 | 0.88 | 3.83 |

*[1]an acrylonitrile-chlorinated polyethylene-styrene copolymer, commercially available from Nippon Showa Denko, Japan.
*[2]an acrylonitrile-butadien-styrene copolymer, commercially available from Cheil Industry, Korea.

TABLE 6

|  | Example No | | | | C. Example No | | |
| --- | --- | --- | --- | --- | --- | --- | --- |
|  | E12 | E13 | E14 | E15 | CE9 | CE10 | CE11 |
| Polymer A-1 g | 70 | 70 | 70 | 70 | 70 | 70 | 70 |
| Polymer B-1 g | 20 | 20 | 20 | 20 | 20 | 20 | 20 |
| Polymer C-3 g | 10 | 10 | 10 | 10 | 10 | 10 | 10 |
| Polymer D | D-1 | D-1 | D-2 | D-2 | D-1 | D-2 | EVA* |
| g | 3 | 5 | 3 | 5 | 10 | 10 | 3 |
| Tensile Strength | 471 | 459 | 465 | 447 | 403 | 394 | 408 |
| Tensile Elongation | 39 | 36 | 34 | 30 | 31 | 28 | 24 |
| Impact Strength | 39 | 41 | 35 | 36 | 43 | 39 | 38 |
| Layer peeling tendency | ○ | ◉ | ○ | ○ | ◉ | ◉ | ○ |

◉: Excellent ○: Good X: Poor
*Ethylene-vinylacetate copolymer, commercially available from Sumitomo Company, Japan.

As shown in Table 6, when Polymers D-1 and D-2 were added, the material properties were superior to the case of adding EVA, while Polymer D-1 gave better results than Polymer D-2. However, if the contents of the Polymers D-1 and D-2 exceed 5 parts, the tensile properties are lowered.

From the Examples and Comparative Examples, it is apparent that the styrenic thermoplastic resin composition according to the present invention can be prepared without a polymerization process and provides superior mechanical properties and weather resistance, as well as improvement in layer peeling tendency.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A thermoplastic resin composition comprising a mixture of:
   A. 50–90% by weight of a styrenic polymer;
   B. 5–35% by weight of a chlorinated polyethylene;
   C. 5–35% by weight of a modified ethylene-propylenic rubber; and
   D. 0–10% by weight of vinyl graft copolymer
wherein the modified ethylene-propylenic rubber present in said composition consists essentially of ethylene-propylenic rubber and carboxyl groups or anhydrous carboxyl groups and is prepared by melt blending a reactive monomer having a carboxyl group or anhydrous carboxyl group and, optionally an organic peroxide, in an ethylene-propylenic rubber.

2. A thermoplastic resin composition according to claim 1, wherein the chlorine content of said chlorinated polyethylene is about 20 to about 40% by weight.

3. A thermoplastic resin composition according to claim 1, wherein the stryrenic polymer is a copolymer of styrene and acrylonitrile.

4. A thermoplastic resin composition according to claim 1, wherein said modified ethylene-propylenic rubber is prepared by melt blending 0–2 parts by weight of an organic peroxide and 1–5 parts by weight of a reactive monomer having a carboxyl group or anhydrous carboxyl group in 100 parts by weight of ethylene-propylenic rubber.

5. A thermoplastic resin composition according to claim 1, wherein said ethylenic-polypropylenic rubber is selected from the group consisting of ethylene-propylene and ethylene-propylene-diene rubber.

6. A thermoplastic resin composition according to claim 1, wherein said reactive monomer having a carboxyl group or anhydrous carboxyl group is selected from the group consisting of maleic acid, maleic anhydride, fumaric acid, acrylic acid, and methacrylic acid ester.

7. A thermoplastic resin composition according to claim 1, containing a vinyl graft copolymer wherein said vinyl graft copolymer contains a copolymer of carboxyl-containing vinyl monomer and olefinic monomer as the backbone chain component.

8. A thermoplastic resin composition according to claim 1, containing a vinyl graft copolymer wherein said vinyl graft copolymer contains a copolymer of styrenic monomer and vinyl cyanide monomer as a branch component.

9. A thermoplastic resin composition comprising a mixture of:
   A. 50–90% by weight of a styrenic polymer;
   B. 5–35% by weight of a chlorinated polyethylene;
   C. 5–35% by weight of a modified ethylene-propylenic rubber; and
   D. 0–10% by weight of vinyl graft copolymer
wherein said modified ethylene-propylenic rubber does not contain vinyl halide monomer grafted thereon and is prepared by melt blending a reactive monomer having a carboxyl group or anhydrous carboxyl group and, optionally an organic peroxide, in an ethylene-propylenic rubber.

10. A thermoplastic resin composition according to claim 9, wherein the chlorine content of said chlorinated polyethylene is about 20 to about 40% by weight.

11. A thermoplastic resin composition according to claim 9, wherein the stryrenic polymer is a copolymer of styrene and acrylonitrile.

12. A thermoplastic resin composition according to claim 9, wherein said modified ethylene-propylenic rubber is prepared by melt blending 0–2 parts by weight of an organic peroxide and 1–5 parts by weight of a reactive monomer having a carboxyl group or anhydrous carboxyl group in 100 parts by weight of ethylene-propylenic rubber.

13. A thermoplastic resin composition according to claim 9, wherein said ethylenic-polypropylenic rubber is selected from the group consisting of ethylene-propylene and ethylene-propylene-diene rubber.

14. A thermoplastic resin composition according to claim 9, wherein said reactive monomer having a carboxyl group or anhydrous carboxyl group is selected from the group consisting of maleic acid, maleic anhydride, fumaric acid, acrylic acid, and methacrylic acid ester.

15. A thermoplastic resin composition according to claim 9, containing a vinyl graft copolymer wherein said vinyl graft copolymer contains a copolymer of carboxyl-containing vinyl monomer and olefinic monomer as the backbone chain component.

16. A thermoplastic resin composition according to claim 9, containing a vinyl graft copolymer wherein said vinyl graft copolymer contains a copolymer of styrenic monomer and vinyl cyanide monomer as a branch component.

17. A thermoplastic resin composition prepared by mixing:
   A. 50–90% by weight of a styrenic polymer;
   B. 5–35% by weight of a chlorinated polyethylene;
   C. 5–35% by weight of a modified ethylene-propylenic rubber; and D. 0–10% by weight of vinyl graft copolymer and melt blending the mixture, wherein the modified ethylene-propylenic rubber present in said composition is prepared in the absence of vinyl halide monomer by melt blending a reactive monomer having a carboxyl group or anhydrous carboxyl group and, optionally an organic peroxide, in an ethylene-propylenic rubber.

18. A thermoplastic resin composition of claim 17 wherein the modified ethylene-propylenic rubber is prepared in the absence of vinyl halide monomer.

19. A thermoplastic resin composition according to claim 18, wherein the chlorine content of said chlorinated polyethylene is about 20 to about 40% by weight.

20. A thermoplastic resin composition of claim 17 wherein the styrenic polymer is a styrenic polymer is a copolymer of styrene and acrylonitrile.

21. A thermoplastic resin composition according to claim 17, wherein said modified ethylene-propylenic rubber is prepared by melt blending 0–2 parts by weight of an organic peroxide and 1–5 parts by weight of a reactive monomer having a carboxyl group or anhydrous carboxyl group in 100 parts by weight of ethylene-propylenic rubber.

22. A thermoplastic resin composition comprising a mixture of:

A. 50–90% by weight of a styrenic polymer;

B. 5–35% by weight of a chlorinated polyethylene;

C. 5–35% by weight of a modified ethylene-propylenic rubber; and

D. 0–10% by weight of vinyl graft copolymer wherein the modified ethylene-propylenic rubber present in said composition is prepared in the absence of vinyl halide monomer by melt blending a mixture of an ethylene-propylenic rubber and a reactive monomer having a carboxyl group or anhydrous carboxyl group and, optionally an organic peroxide.

* * * * *